United States Patent
Pavlov

(10) Patent No.: US 10,556,655 B2
(45) Date of Patent: Feb. 11, 2020

(54) DRIVING DEVICE FOR A WATERCRAFT

(71) Applicant: Marine Jet Power AB, Uppsala (SE)

(72) Inventor: Stanislav Pavlov, Saint Petersburg (RU)

(73) Assignee: Marine Jet Power AB, Uppsala (SE)

( * ) Notice: Subject to any disclaimer, the term of this patent is extended or adjusted under 35 U.S.C. 154(b) by 0 days.

(21) Appl. No.: 16/097,707

(22) PCT Filed: Apr. 27, 2017

(86) PCT No.: PCT/SE2017/050413
§ 371 (c)(1),
(2) Date: Oct. 30, 2018

(87) PCT Pub. No.: WO2017/192086
PCT Pub. Date: Nov. 9, 2017

(65) Prior Publication Data
US 2019/0135397 A1    May 9, 2019

(30) Foreign Application Priority Data

May 2, 2016 (SE) ...................... 1650591

(51) Int. Cl.
*B63H 11/08* (2006.01)
*F16H 1/28* (2006.01)

(52) U.S. Cl.
CPC ............... *B63H 11/08* (2013.01); *F16H 1/28* (2013.01); *B63H 2011/085* (2013.01); *F16H 2001/2881* (2013.01)

(58) Field of Classification Search
CPC ..... B63H 11/08; B63H 2011/085; F16H 1/28; F16H 2001/2881; F16H 2011/2881
See application file for complete search history.

(56) References Cited

U.S. PATENT DOCUMENTS

| 3,269,111 A | 8/1966 | Brill |
| 3,561,392 A * | 2/1971 | Baez .................... B63H 11/103 440/43 |

(Continued)

FOREIGN PATENT DOCUMENTS

| AU | 2537792 A | 4/1993 |
| AU | 697351 B | 10/1998 |

(Continued)

OTHER PUBLICATIONS

International Search Report and Written Opinion regarding Int'l. Appl. No. PCT/SE2017/050413, dated Jun. 21, 2017, 15 pps.

(Continued)

*Primary Examiner* — Stephen P Avila
(74) *Attorney, Agent, or Firm* — Foley & Lardner LLP

(57) ABSTRACT

Driving device for a watercraft, which device comprises a water flow channel (10) which is connected to the watercraft, preferably to the bottom thereof, and which has an inlet (11) and an outlet (12), a drive shaft (13, 14) which extends into said channel (10), a bearing shaft (15) coaxially arranged with the drive shaft part (14) in said channel, a first rotating impeller (21) connected to the drive shaft (13) for rotation in said channel (10) for the movement of water in either direction between the inlet (11) and the outlet (12), a second impeller (22) which is contra-rotating to the first impeller (21) and connected to the bearing shaft (15) for rotation in said channel (10) for the movement of water in said direction between the inlet (11) and the outlet (12), and that the drive shaft (13, 14) and the bearing shaft (15) are connected to each other via a planetary-like gearing (30), wherein one of said impellers (21, 22) is formed with an impeller casing (31) which is provided with an outer surface (322) and inside which, said gearing (30) is situated.

15 Claims, 1 Drawing Sheet

(56) References Cited

U.S. PATENT DOCUMENTS

| | | |
|---|---|---|
| 5,480,330 A | 1/1996 | Brown |
| 5,720,638 A | 2/1998 | Hale |
| 6,273,768 B1 | 8/2001 | Blanchard |
| 2006/0205293 A1 | 9/2006 | Fuse |

FOREIGN PATENT DOCUMENTS

| | | |
|---|---|---|
| DE | 3726242 A1 | 2/1989 |
| DE | 102015111291 A1 | 12/2016 |
| FR | 1277975 A | 12/1961 |
| WO | WO 9857848 A1 | 12/1998 |

OTHER PUBLICATIONS

International Preliminary Report on Patentability dated May 21, 2018 with amended claims, 11 pps.

\* cited by examiner

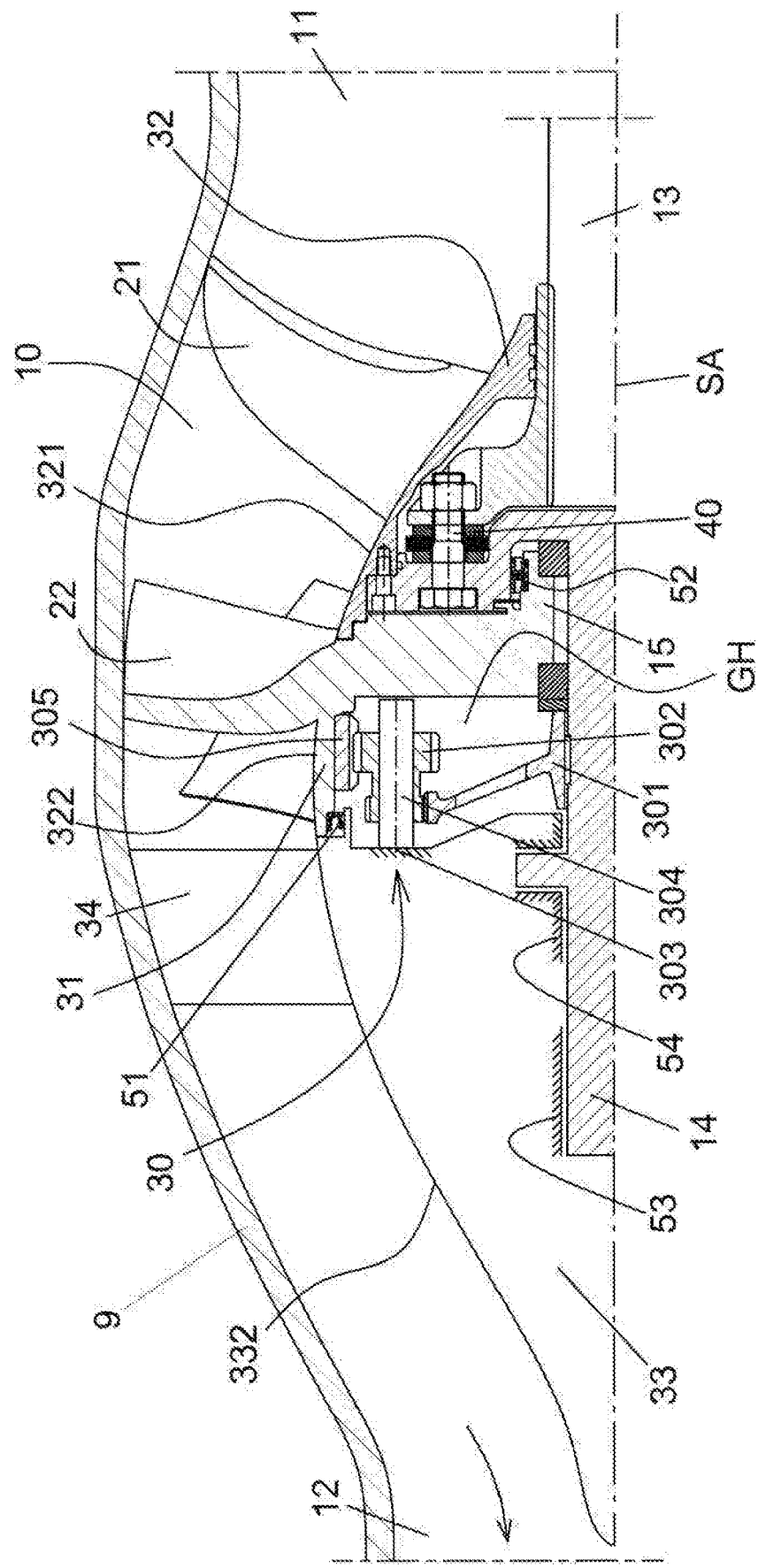

DRIVING DEVICE FOR A WATERCRAFT

TECHNICAL FIELD

The present invention relates to driving devices for watercrafts of the type of devices that produces a driving force by a water current, which, among other things, can drive the craft ahead. Particularly, the present invention relates to such driving devices that are provided with contra-rotating impellers which create the driving water current.

BACKGROUND OF THE INVENTION

From the American document U.S. Pat. No. 5,480,330, such a driving device is previously known which shows a device that is provided with two contra-rotating impellers, which provide a water flow through a water tunnel the rotations of which are provided by the fact that a first drive shaft drives a first impeller in a first direction of rotation and that a second drive shaft, concentric with the first drive shaft, drives a second impeller in a second direction of rotation by a toothed gearing being situated between the drive shafts.

As is seen in the American document U.S. Pat. No. 5,480,330, the toothed gearing, which provides the opposite directions of rotation, is situated outside the water tunnel, which implies that the two drive shafts will be relatively long at the same time as the toothed gearing will occupy no little volume beside the water tunnel.

Thus, such a driving device will be bulky in an installation in a boat on one hand by the gear case being placed outside the drive device as well as by the device requiring long double concentric drive shafts. By long concentric drive shafts, there is a great risk of unbalances and vibrations caused by the drive shafts.

The American document U.S. Pat. No. 6,273,768 shows a drive device for water operation which is provided with two contra-rotating impellers. The document shows that the drive device is provided with a conical toothed gearing to provide the contra-rotating motions of the impellers. The toothed gearing is placed inside the water tunnel and fitted in a gear housing placed downstream of the two impellers. The gear housing is in this connection stationary and fixedly connected to the inside of the water tunnel. A change gear of the toothed gearing is journalled in a fixed bearing housing directly in the water tunnel. Such a fixed bearing housing in the water tunnel will contribute to the water current through the drive device becoming turbulent by flow obstruction at these bearing housings. By the conical toothed gearing being formed with coaxial drive shafts, which extend outside the plane of rotation of the impellers, there is a great risk of vibrations and journalling problems for the drive shafts.

THE OBJECT OF THE INVENTION

The object of the present invention is to provide a driving device having contra-rotating impellers for a watercraft, which driving device is considerably less space-requiring than previously known driving devices.

The object is furthermore that the driving device is formed to influence to the smallest possible extent the flowing through flow as little as possible.

Furthermore, the object is to eliminate a long drive shaft in order to in such a way provide greater reliability of the device by the fact that unbalances and vibrations between the drive shafts can be eliminated.

SUMMARY OF THE INVENTION

By the present invention, such as this is seen in the independent claims, the above-mentioned objects are met, wherein said disadvantages have been eliminated. Suitable embodiments of the invention are defined in the dependent claims.

The invention concerns a driving device for a watercraft which device may be either a forward propelling device, a steering device or a lateral moving device. The drive device comprises a water flow channel which is connected to the watercraft, preferably to the bottom thereof, and which has an inlet and an outlet. Between the inlet and the outlet, water is pumped which in view of the linear momentum thereof drives the craft in a direction opposite the direction of the outflowing water. A reversal of the pump direction implies that the craft is driven in the opposite direction. The device is provided with a drive shaft which extends into said channel, which drive shaft is journalled in an axially situated stator inside the channel and connected to the interior of the water flow channel. In addition, a bearing shaft is coaxially arranged with the drive shaft in said channel. A first rotating impeller is connected to the drive shaft for rotation in said channel, which impeller works for the movement of water in either direction between the inlet and the outlet, which implies that in a first direction of rotation of the first impeller, water is moved from the inlet toward the outlet and in a second direction of rotation of the first impeller, water is moved from the outlet toward the inlet. A second impeller contra-rotating to the first impeller is connected to the bearing shaft for rotation in said channel also for the movement of water in either direction between the inlet and the outlet, which implies that in a first direction of rotation of the second impeller, water is moved from the inlet toward the outlet and in a second direction of rotation of the second impeller, water is moved from the outlet toward the inlet. In addition, the drive shaft and the bearing shaft are rotatably coupled to each other via a planetary-like gearing. Characteristic of the invention is that one of said impellers is formed with an impeller casing which is provided with an outer surface and inside which, said gearing is situated. The very use of a planetary-like gearing gives the driving device a compact geometry at the same time as the gearing type can be adapted to different operation situations. To the inside of the impeller casing, an internal ring gear of the planetary-like gearing is fixedly connected, which gives an extraordinarily compact design of the gearing. This design of the gearing implies in addition that all gears are of cylindrical type. For instance, a driving motor of the drive device may have an output of 3 500-4 000 kW, which driving motor drives the drive shaft by a shaft speed of 1 000-1 100 r/min. Other outputs and rotational speeds are naturally possible within the scope of the invention. The term "planetary-like gearing" has been used because the shafts on which the planet gears are journalled are fixed to a stator, which implies that no planet holder that can rotate around the sun gear exists while in other respects the used terminology corresponds to a conventional planetary gearing having rotatable planet holder.

By this design with a planetary-like gearing inside one of the impeller casings, a very compact driving device is obtained which in addition only requires one input drive shaft through the wall of the water flow channel.

In one embodiment of the invention, the second of said impellers is formed with a rotor cap having an outer surface which connects on a level to the outer surface of said impeller casing. By such a design, an advantageous streamline shape of the driving device is provided.

In one embodiment of the invention, the impeller situated closest to the outlet connects to the outer surface thereof on a level to the outer surface of the stator. Also this embodiment contributes to the streamline shape of the driving device which is held intact to retain as laminar a water flow around the drive device as possible.

In one embodiment of the invention, the stator is provided with a number of stationary and radially directed direction blades. These direction blades aim at directing the water current in a longitudinal direction in the water flow channel after the water has passed the two impellers. The direction blades contribute to provide, from a turbulent flow through the impellers, a flow being as far as possible laminar.

In one embodiment of the invention, the direction blades are connected to the interior of the water flow channel with the additional purpose of supporting the stator in the water flow channel.

In one embodiment of the invention, one or more of said outer surfaces have the shape of a surface of revolution which a part of or together constitute a complete drop-shape with the most slender tip thereof facing the outlet. Such a drop-shape aims at creating the smallest possible flow losses in the water flow channel.

In one embodiment of the invention, the planetary-like gearing comprises a sun gear, which is rotationally fixedly connected to the drive shaft; a number of planet gears, which are in tooth engagement with the sun gear; a planet holder on which the planet gears are supported and rotatably journalled on a respective planet shaft that is oriented in parallel in relation to the drive shaft, the planet holder being fixedly connected to the stator and an internal ring gear, which is in tooth engagement with said planet gears and which is rotationally fixedly connected to the bearing shaft. In the embodiment illustrated, the planet holder and the stator are the same component but in other embodiments, the planet holder and the stator could be separate components but rotatably locked to each other by, for instance, splines, journals, wedges, etc. The internal ring gear is in addition directly and rotationally fixedly connected to the inside of the impeller's casing surrounding the gearing, which affords a direct and precise driving of the impeller.

In one embodiment of the invention, each planet gear comprises two coaxially placed gear rims having different diameters, one gear rim of which is in tooth engagement with the sun gear and the other gear rim is in tooth engagement with the internal ring gear. That the planet gears are provided with two gear rims implies that the entire gearing can be adapted to specific operating conditions by replacing planet gear and sun gear to obtain another gear ratio. Thus, this design of gearing contributes to the rotational speed of the impellers can be different and adapted to the blade angles of the impellers to afford an optimally adapted driving device.

In one embodiment of the invention, all included gears of the planetary-like gearing are of cylindrical type. This type of gear contributes to a relatively small extension in the axial direction of the planetary-like gearing.

In one embodiment of the invention, said stator is connected to the interior of the water flow channel downstream or upstream of the two impellers.

In one embodiment of the invention, said inlet is afore upstream and said outlet is abaft downstream in relation to each other in the watercraft. This placement aims at a forward propulsion of the craft unlike if inlet and outlet would have been situated in the same lateral position in the craft, which may be the case in a drive device aimed at turning or lateral movement.

In one embodiment of the invention, the drive shaft comprises a first shaft part connected to a second shaft part by fixed or flexible coupling joint. Such a flexible coupling joint contributes to minimize vibrations from the two impellers and in addition make the driving of the same smoother and less whipping. In case the coupling joint is fixed, the fitting of the driving device is facilitated by the drive shaft being in two pieces and can be fixedly fitted together which, for instance, may take place by a spline joint.

In one embodiment of the invention, the second shaft part is connected to said stator and journalled in the same by a shaft bearing as well as by a thrust bearing.

In one embodiment of the invention, the first shaft part and the second shaft part are located on the same symmetry axis, i.e., concentrically, without being coaxially placed in relation to each other. This means that the shaft parts are placed one after the other with one end of the first shaft part which faces an end of the second shaft part.

In one embodiment of the invention, the planetary-like gearing is sealed against the water flow channel by at least two liquid seals being placed on a respective side of the gearing.

In one embodiment of the invention, the planetary-like gearing is placed in a gear housing which is situated inside the impeller casing of the second impeller.

In one embodiment of the invention, the second impeller is placed downstream of the first impeller upon ahead propulsion of the craft.

In the subsequent detailed description of one shown embodiment of the drive device, it is indicated that the water flow channel should be connected to the bottom of a watercraft. This is the most common embodiment of the invention, but within the scope of the invention, this water flow channel may be placed in an outboard motor.

In addition, the invention concerns a watercraft provided with a drive device according to what has previously been indicated.

BRIEF DESCRIPTION OF THE DRAWINGS

The invention will now be described in more detail with references in connection with the accompanying drawing FIGURE. The drawing FIGURE only shows an explanatory sketch intended to facilitate the understanding of the invention.

FIG. 1 schematically shows an axial section through a driving device according to the invention.

DESCRIPTION OF THE INVENTION

FIG. 1 shows an axial section through a driving device according to the invention. The device comprises a water flow channel 10, which is limited by channel walls 9. The water flow channel 10 is provided with an inlet 11 and an outlet 12. The water flow channel is connected to a watercraft and preferably the bottom thereof so as to by pumping water from the inlet 11 toward and through the outlet 12 give the watercraft a forwardly directed motion counter-directed to the water current having a motion according to the arrow in the FIGURE. Said motion is most often a forward propelling motion but may also be a turning or a lateral moving motion. In addition, a reversing motion can be provided by either shifting direction of rotation of the pump or by deflection devices redirecting the water current in the opposite direction.

The drive device comprises a drive shaft 13, 14 which extends into the water flow channel 10 from a location outside the same and from which location the drive shaft is driven by a motor, not shown. In the embodiment illustrated, the drive shaft is divided into a first shaft part 13 and a second shaft part 14 which two shaft parts rotate around the same symmetry axis SA and are interconnected by a flexible coupling joint 40.

The drive shaft 13, 14 drives a first rotating impeller 21 and a second contra-rotating impeller 22. The second impeller 22 is placed downstream closest to the outlet 12 in relation to the first impeller 21. The second impeller 22 is provided with a bearing shaft 15 coaxially arranged with the second shaft part 14 of the drive shaft 13, 14 in said channel 10. The second shaft part 14 is journalled in an axially situated stator 33 connected to the water flow channel 10.

Furthermore, the drive shaft 13, 14 and the bearing shaft 15 are rotatably coupled to each other via a planetary-like gearing 30, which on one hand provides an adaptation of the rotational speeds of the impellers and on the other hand provides a contra-rotation of one of the impellers in relation to the second impeller.

As shown in the FIGURE, the second impeller 22 is provided with an impeller casing 31 which connects to the stator 33 in such a way that their respective outer surfaces 322, 332 connect on a level with each other. Inside the impeller casing 31, there is formed a gear housing GH in which the planetary-like gearing 30 is situated. Also the first impeller 21 is provided with a casing in the form of a rotor cap 32 having an outer surface 321 which connects on a level to the outer surface 322 of the impeller casing 31.

The body for the drive device placed in the water flow channel is intended to afford as optimum a water flow around the body as possible and therefore the body is formed with a drop-shape. One or more of said outer surfaces 321, 322, 332 have the shape of a surface of revolution, which constitutes a part of or which together constitute a complete drop-shape oriented with the tip thereof facing the outlet 12.

In the embodiment illustrated, the gear housing GH is formed of the second impeller 22, but within the scope of the invention, the gear housing may alternatively be formed of the first impeller 21. Even if the embodiment shown has been provided with a flexible coupling joint 40 between the first shaft part 13 and the second shaft part 14 with the purpose of decreasing the transfer of vibrations between the shaft parts, embodiments within the scope of the invention may comprise only one drive shaft without this flexible coupling joint and in such a way the space inside the first impeller could be adapted to a gearing with the corresponding function as the planetary-like gearing 30 shown.

In the embodiment illustrated, the stator 33 is provided with a number of stationary and radially directed direction blades 34, which are connected to the interior of the water flow channel 10. The direction blades 34 are placed downstream of the two impellers 21, 22 and aim at, to a certain extent, recreating a laminar water flow. Furthermore, the direction blades 34 connected to the water flow channel 10 aim at supporting the stator 33 in the channel.

The planetary-like gearing 30 shown comprises a sun gear 301, which is rotationally fixedly connected to the second shaft part 14 of the drive shaft. The sun gear 301 is in tooth engagement with a number of planet gears 302, which in turn are in tooth engagement with an internal ring gear 305, which is fixedly connected with the second impeller 22. The second impeller 22 is fixedly connected with said bearing shaft 15. In addition, a planet holder 303, which is fixedly connected to the stator 33, is arranged with planet axes 304 on which the planet gears 302 are supported and rotatably journalled.

Each planet gear 302 comprises two gear rims having different diameters and accordingly a different number of teeth, one gear rim of which is in tooth engagement with the sun gear 301 and the other gear rim is in tooth engagement with the internal ring gear 305. By letting the planet gears 302 comprising two gear rims, there is obtained a possibility of, to a certain extent, adapting the rotational speeds between the first impeller 21, i.e., the drive shaft 13, 14, and the second impeller 22.

The planetary-like gearing 30 is sealed against the water flow channel 10 by two liquid seals 51, 52 placed on a respective side of the gearing 30. One liquid seal 51 is placed between the stator 33 and the impeller casing 31 of the second impeller 22. The other liquid seal 52 is placed between the drive shaft 13, 14 and the bearing shaft 15, which is a part of the second impeller 22. In such a way, the gear housing GH is sealed against surrounding water.

In the embodiment illustrated according to the FIGURE, the second shaft part 14 is connected to the stator 33 by being journalled in the same by a radial shaft bearing 53 as well as by a thrust bearing 54.

In embodiments having an undivided drive shaft, this is correspondingly journalled with radial bearing and thrust bearing.

The invention claimed is:

1. A driving device for a watercraft, comprising:
   a water flow channel connected to the watercraft and having an inlet and an outlet,
   a drive shaft extending into said channel, the drive shaft journalled in a stator coaxial with the drive shaft and connected to the water flow channel,
   a bearing shaft coaxially arranged with a drive shaft part in said channel,
   a first rotating impeller connected to the drive shaft for rotation in said channel for the movement of water in either direction between the inlet and the outlet, and
   a second impeller which is contra-rotating to the first impeller and connected to the bearing shaft for rotation in said channel for the movement of water in said direction between the inlet and the outlet,
   wherein the drive shaft and the bearing shaft are rotatably coupled to each other via a planetary gearing, the planetary gearing comprising:
      a sun gear rotationally fixedly connected to the drive shaft;
      a number of planet gears in tooth engagement with the sun gear;
      a planet holder fixedly connected to the stator, wherein each of the planet gears is supported and rotatably journalled on a respective planet shaft of the planet holder which is parallel to the drive shaft;
      an internal ring gear in tooth engagement with said planet gears and rotationally fixedly connected to the bearing shaft,
   wherein each planet gear comprises two coaxially placed gear rims having different diameters, wherein one gear rim of the two coaxially placed gear rims is in tooth engagement with the sun gear and the other gear rim of the two coaxially placed gear rims is in tooth engagement with the internal ring gear, and
   wherein said second impeller is formed with an impeller casing having an outer surface forming a gear housing, said planetary gearing situated entirely inside the gear housing.

2. The driving device of claim 1, wherein the second impeller is formed with a rotor cap having an outer surface of the rotor cap which connects on a level to the outer surface of said impeller casing.

3. The driving device claim 1, wherein the second impeller connects to the bearing shaft with the outer surface of the impeller casing on a level to an outer surface of the stator.

4. The driving device of claim 3, wherein the stator is provided with a number of stationary and radially directed direction blades.

5. The driving device of claim 4, wherein the direction blades are connected to an interior of the water flow channel.

6. The driving device of claim 1, wherein one or more of the outer surface of the impeller casing, an outer surface of the stator, or an outer surface of a rotor cap have a surface of revolution having a shape which a part of or which together constitutes a complete drop-shape, the tip of the complete drop-shape facing the outlet.

7. The driving device of claim 1, wherein all included gears of the planetary gearing are of a cylindrical type.

8. The driving device of claim 1, wherein said stator is connected to an interior of the water flow channel downstream or upstream of the first impeller and the second impeller.

9. The driving device of claim 1, wherein said inlet is positioned upstream in relation to said outlet and said outlet is positioned downstream in relation to said inlet.

10. The driving device of claim 1, wherein the drive shaft comprises a first shaft part connected to a second shaft part by a fixed or flexible coupling joint.

11. The driving device of claim 10, wherein the first shaft part and the second shaft part are located on a same symmetry axis without the first shaft part and the second shaft part being coaxially placed in relation to each other.

12. The driving device of claim 11, wherein the second shaft part is connected to said stator and journaled in the stator by a shaft bearing as well as by a thrust bearing.

13. The driving device of claim 1, wherein the planetary gearing is sealed against the water flow channel by at least two liquid seals, each liquid seal placed on a respective side of the planetary gearing.

14. The driving device of claim 1, wherein the second impeller is placed downstream of the first impeller upon ahead propulsion of the watercraft.

15. A watercraft, comprising:
a driving device, the driving device comprising:
   a water flow channel connected to the watercraft and having an inlet and an outlet,
   a drive shaft extending into said channel, the drive shaft journalled in a stator coaxial with the drive shaft and connected to the water flow channel,
   a bearing shaft coaxially arranged with a drive shaft part in said channel,
   a first rotating impeller connected to the drive shaft for rotation in said channel for the movement of water in either direction between the inlet and the outlet,
   a second impeller which is contra-rotating to the first impeller and connected to the bearing shaft for rotation in said channel for the movement of water in said direction between the inlet and the outlet,
wherein the drive shaft and the bearing shaft are rotatably coupled to each other via a planetary gearing, the planetary gearing comprising:
   a sun gear rotationally fixedly connected to the drive shaft;
   a number of planet gears in tooth engagement with the sun gear;
   a planet holder fixedly connected to the stator, wherein each of the planet gears is supported and rotatably journalled on a respective planet shaft of the planet holder which is parallel to the drive shaft;
   an internal ring gear in tooth engagement with said planet gears and rotationally fixedly connected to the bearing shaft,
wherein each planet gear comprises two coaxially placed gear rims having different diameters, wherein one gear rim of the two coaxially placed gear rims is in tooth engagement with the sun gear and the other gear rim of the two coaxially placed gear rims is in tooth engagement with the internal ring gear; and
wherein said second impeller is formed with an impeller casing having an outer surface forming a gear housing, said planetary gearing situated entirely inside the gear housing.

* * * * *